US012092971B2

(12) United States Patent
Katagiri

(10) Patent No.: US 12,092,971 B2
(45) Date of Patent: Sep. 17, 2024

(54) IMAGE FORMING APPARATUS

(71) Applicant: KONICA MINOLTA, INC., Tokyo (JP)

(72) Inventor: Tatsuya Katagiri, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/105,765

(22) Filed: Feb. 3, 2023

(65) Prior Publication Data

US 2023/0266696 A1 Aug. 24, 2023

(30) Foreign Application Priority Data

Feb. 18, 2022 (JP) ................................ 2022-023401

(51) Int. Cl.
*G03G 15/00* (2006.01)
*G03G 15/08* (2006.01)
*G03G 21/16* (2006.01)

(52) U.S. Cl.
CPC ..... *G03G 15/0867* (2013.01); *G03G 21/1642* (2013.01); *G03G 21/1676* (2013.01)

(58) Field of Classification Search
CPC .......... G03G 15/0867; G03G 21/1642; G03G 21/1676
USPC ........................................ 399/107, 111, 119
See application file for complete search history.

(56) References Cited

U.S. PATENT DOCUMENTS

2013/0257455 A1* 10/2013 Ahne .................... G01F 23/266 324/658

FOREIGN PATENT DOCUMENTS

| | | |
|---|---|---|
| JP | 2006220794 | * 8/2006 |
| JP | 2007331912 | * 12/2007 |
| JP | 2010131755 | * 6/2010 |
| JP | 2014-102402 A | 6/2014 |
| JP | 2021167899 | * 10/2021 |

* cited by examiner

*Primary Examiner* — Hoan H Tran

(74) *Attorney, Agent, or Firm* — Squire Patton Boggs (US) LLP

(57) ABSTRACT

An image forming apparatus includes: a main body that forms an image on a sheet; and a removable unit that is attachable and removable to and from the main body, wherein the removable unit includes a first unit attachable to an outside of the main body, and is packable separately from the main body in a state removed from the main body.

7 Claims, 7 Drawing Sheets

IMAGE FORMING APPARATUS

CROSS-REFERENCE TO RELATED APPLICATIONS

The entire disclosure of Japanese Patent Application No. 2022-023401 filed on Feb. 18, 2022 is incorporated herein by reference in its entirety.

TECHNICAL FIELD

The present invention relates to an image forming apparatus.

DESCRIPTION OF THE RELATED ART

Conventionally, an image forming apparatus that forms an image on a sheet has been known. Conventionally, it is typical that the image forming apparatus has a shape that can be accommodated in a substantially rectangular parallelepiped. With respect to such a conventional image forming apparatus (conventional machine), in cases of retrofitting development based on an existing apparatus, such as a case of development of improving the performance while moderating the cost based on a conventional machine, and a case of adding custom-tailored development dedicated to a user, a mechanism configuration is sometimes adopted that is extended to partially protrude and not to be accommodated in the conventional substantially rectangular parallelepiped.

As a configuration similar to the configuration not to be accommodated in the substantially rectangular parallelepiped, for example, a configuration has been known that is of an image forming apparatus that includes a housing, a drum cartridge configured to be attached to the housing, and a development cartridge configured to be attachable and removable to and from the drum cartridge, and is packed integrally with the housing in a state where the development cartridge is disposed outside of the housing (e.g., see JP 2014-102402A). This configuration is to address a problem that when the apparatus is packed in a state where the development cartridge is attached to the inside of the housing and is transported, a possible spill of toner in the development cartridge to the outside of the cartridge largely affects the housing. That is, packing the development cartridge integrally with the housing in a state where the development cartridge is disposed outside of the housing can prevent the inside of the housing from being stained in case the toner is spilled.

SUMMARY OF THE INVENTION

However, in a case where a unit is retrofitted to an existing apparatus, the barycentric position of the entire apparatus is sometimes largely changed. A certain way of retrofitting sometimes affects the strength of the housing. Accordingly, in case of large adverse effects of vibrations and shocks during transportation, the housing is required to be additionally reinforced, which leads to increase in size and cost of the apparatus.

Deformation in a direction where the external shape of the apparatus is extended likely prevents the same packing material as that of the conventional machine from being used. Consequently, a dedicated packing material is required, which increases the packing size in comparison with that of the conventional machine, and leads to increase in cost. As with the configuration described in JP 2014-102402A, the case of packing integrally with the housing in the state where the development cartridge is arranged outside of the housing similarly requires a dedicated packing material, which increases the packing size in comparison with that of the conventional machine, and leads to increase in cost.

Furthermore, according to a certain configuration of an apparatus, vibrations and shocks during transportation are unavoidably applied to the packing material, which complicates the packing configuration and leads to further increase in cost.

The present invention has an object to provide an image forming apparatus that can prevent the apparatus from being deformed by adverse effects of vibration shocks occurring during transportation, and suppress increase in cost.

To achieve at least one of the abovementioned objects, according to an aspect of the present invention, an image forming apparatus including a main body that forms an image on a sheet; and a removable unit that is attachable and removable to and from the main body, wherein the removable unit includes a first unit attachable to an outside of the main body, and is packable separately from the main body in a state removed from the main body.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

As shown in FIGS. 1 to 4, an image forming apparatus 1 according to this embodiment includes a main body 10 that forms an image on a sheet, and a removable unit 20 that is attachable and removable to and from the main body 10.

Figure 1:
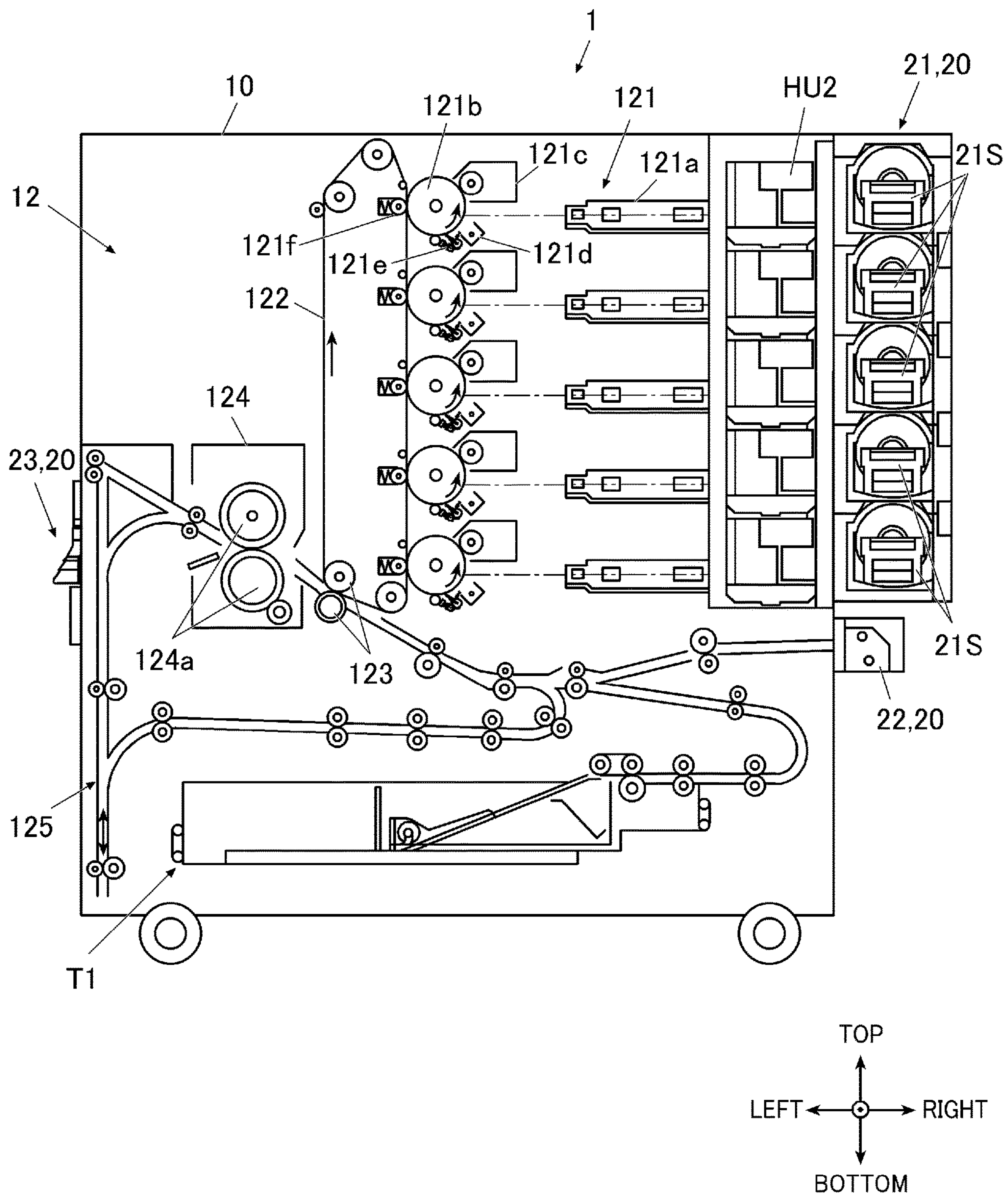
FIG. 1 is a front view showing a schematic configuration of an image forming apparatus according to this embodiment.
Figure 4:
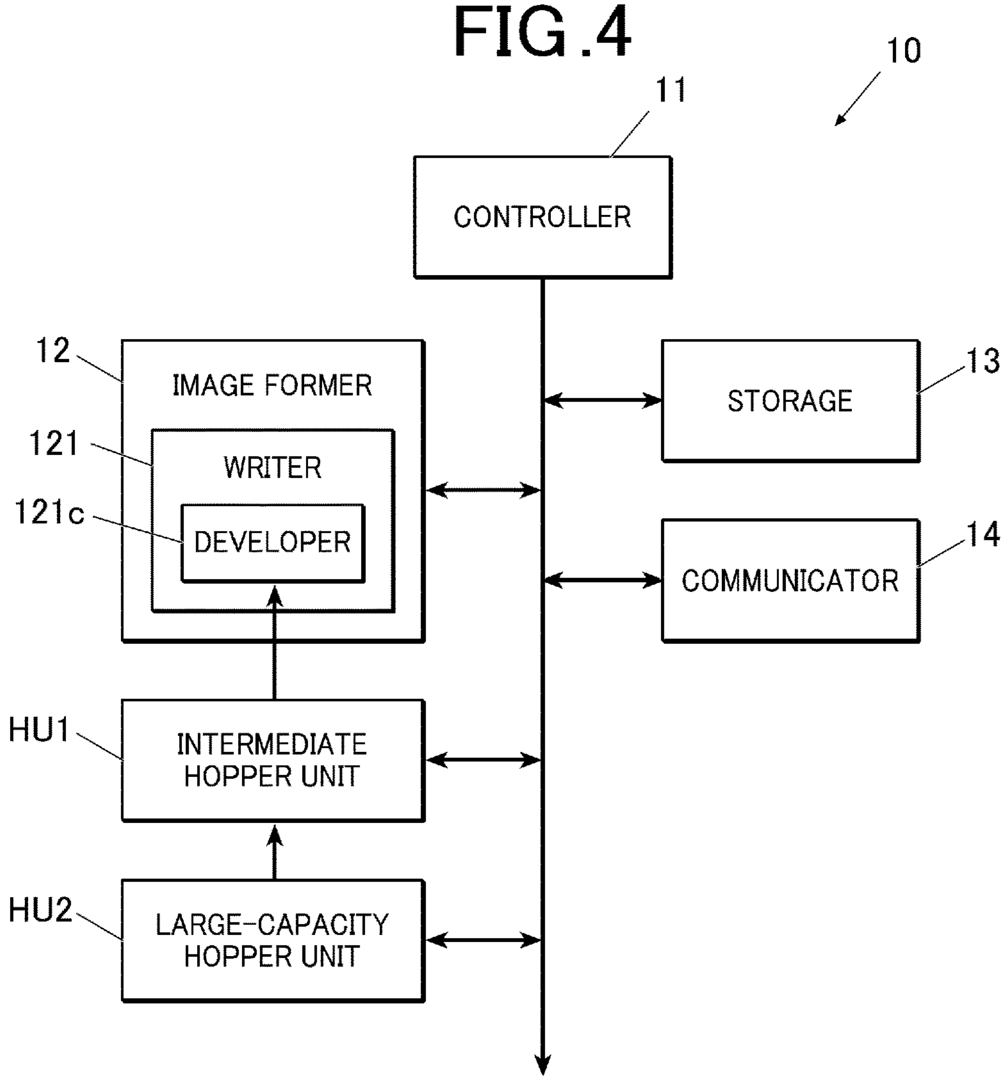
FIG. 4 is a functional block diagram showing a control structure of the image forming apparatus (main body) according to this embodiment.

As shown in FIGS. 1 and 4, the main body 10 includes a controller (hardware processor) 11, an image former 12, a storage 13 and a communicator 14.

The controller 11 includes a CPU, a RAM and a ROM. In accordance with an instruction signal received by the communicator 14, the CPU reads various processing programs stored in the ROM and deploys the programs on the RAM, and integrally controls the operation of the image forming apparatus 1 through cooperation with the various programs deployed on the RAM.

The image former 12 forms, on a sheet, an image made up of five colors of Y, M, C, K and W (white) in accordance with five-color pixel values of the pixels in an original image subjected to image processing. Note that in this embodiment, the description is made with W (white) being exemplified as the fifth color. However, there is no limitation to this. A configuration may be adopted where a spot color (red, gold, etc.) or other color is used instead of W (white).

As shown in FIG. 1, the image former 12 includes five writers 121, an intermediate transfer belt 122, a secondary transfer roller 123 and a fixer 124.

The five writers 121 are arranged in series (tandem) along a belt surface of the intermediate transfer belt 122, and form images of colors of Y, M, C, K and W. The writers 121 have the same configuration except only that the colors of images to be formed are different. Each writer 121 includes an optical scanner 121*a*, a photoconductor 121*b*, a developer 121*c*, a charger 121*d*, a cleaner 121*e* and a primary transfer roller 121*f*.

During image formation, in each writer 121, the photoconductor 121*b* is charged by the charger 121*d*, and subsequently the photoconductor 121*b* is scanned with a light flux emitted from the optical scanner 121*a* based on the original image, thus forming an electrostatic latent image. Color materials, such as toner, are supplied by the developer 121*c* and development is performed, which forms an image (toner image) on the photoconductor 121*b*.

The images formed on the photoconductors 121*b* of the five writers 121 are sequentially transferred on the intermediate transfer belt 122 in an overlaid manner by the respective primary transfer rollers 121*f* (primary transfer). Accordingly, an image made of the individual colors is formed on the intermediate transfer belt 122. The intermediate transfer belt 122 is wound by a plurality of rollers and rotated. After the primary transfer, the color materials remaining on the photoconductor 121*b* are cleaned by the cleaner 121*e*.

At the image former 12, a sheet is supplied from a sheet feed tray T1 in synchronization with timing when the image on the rotating intermediate transfer belt 122 reaches the position of the secondary transfer roller 123. The secondary transfer roller 123 constitutes one of a pair of rollers between which one roller is in pressed contract with the intermediate transfer belt 122 and the other winds the intermediate transfer belt 122. Through pressed contact with the secondary transfer roller 123, the image is transferred from the intermediate transfer belt 122 onto the sheet (secondary transfer), the sheet is conveyed to the fixer 124, is subjected to a fixing process and then is discharged. The fixing process is a process of heating and applying pressure to the sheet by fixing rollers 124*a*, and fixing the image on the sheet. In a case of forming images on both sides of a sheet, the sheet is conveyed to a reverse path 125 and the sheet surfaces are reversed, and subsequently the sheet is fed again to the position of the secondary transfer roller 123.

In this embodiment, the developers 121*c* are provided for the respective colors. The developers 121*c* develop electrostatic latent images using developing agents that include toner of different colors respectively. With respect to each developer 121*c* provided for the corresponding color, as shown in FIGS. 1 and 4, the main body 10 internally includes: an intermediate hopper unit HU1 that temporarily stores toner and supplies the toner to the developer 121*c*; and a large-capacity hopper unit HU2 that temporarily stores a large amount of toner and supplies the toner to the intermediate hopper unit HU1.

The storage 13 is non-volatile storage means that includes an HDD (hard disk drive) and an SSD (solid state drive), and stores various programs, various setting data items and the like in a readable and writable manner from and into the controller 11.

The communicator 14 is an interface for connecting the image forming apparatus 1 to a communication network. The communicator 14 includes a communication IC and a communication connector, and transmits and receives various types of information to and from an external apparatus connected to the communication network, using a predetermined communication protocol, under control of the controller 11. The communicator 14 can also receive and output the various types of information via a USB drive.

Figure 2:
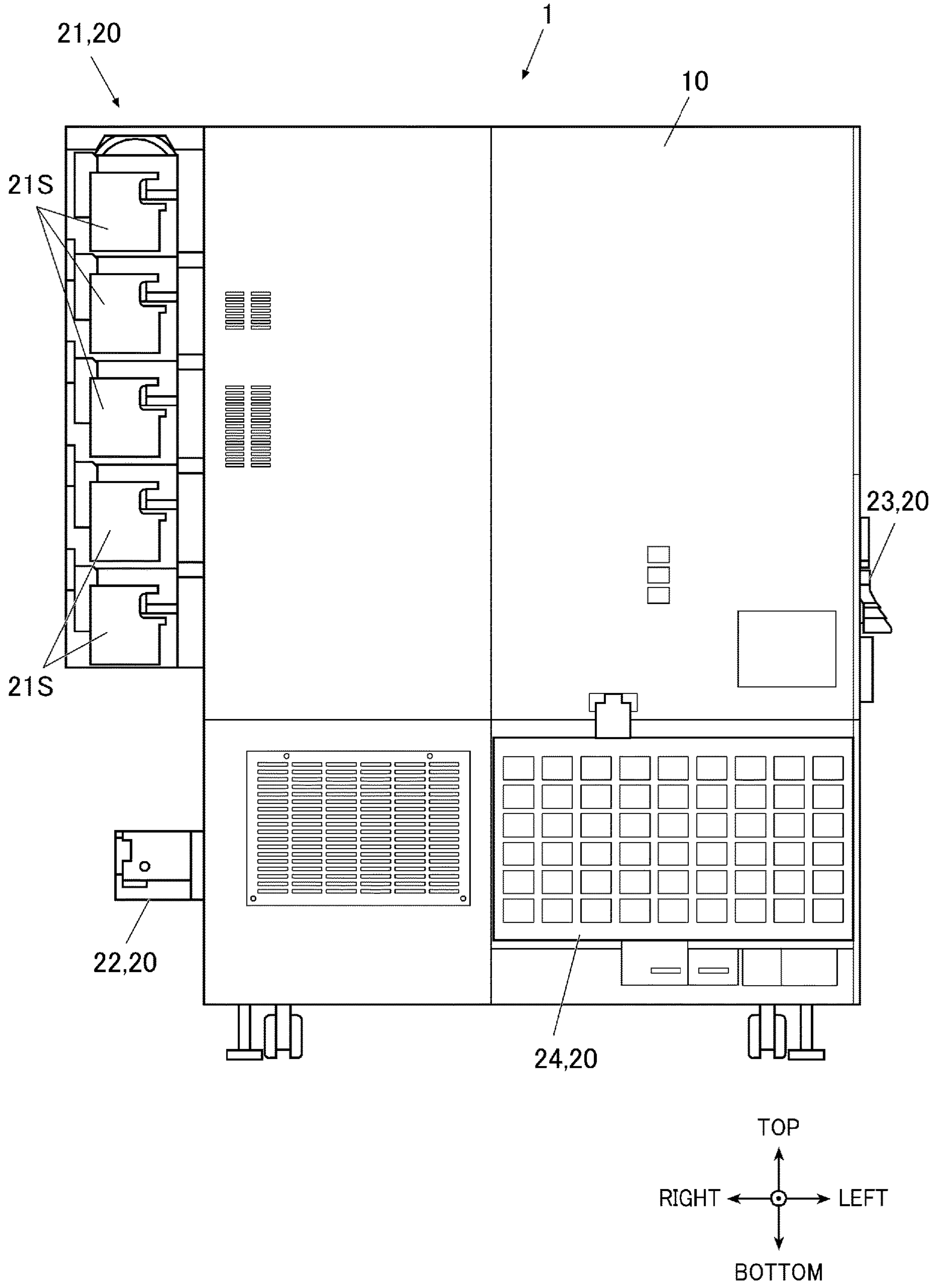
FIG. 2 is a back view showing the schematic configuration of the image forming apparatus according to this embodiment.
Figure 3:
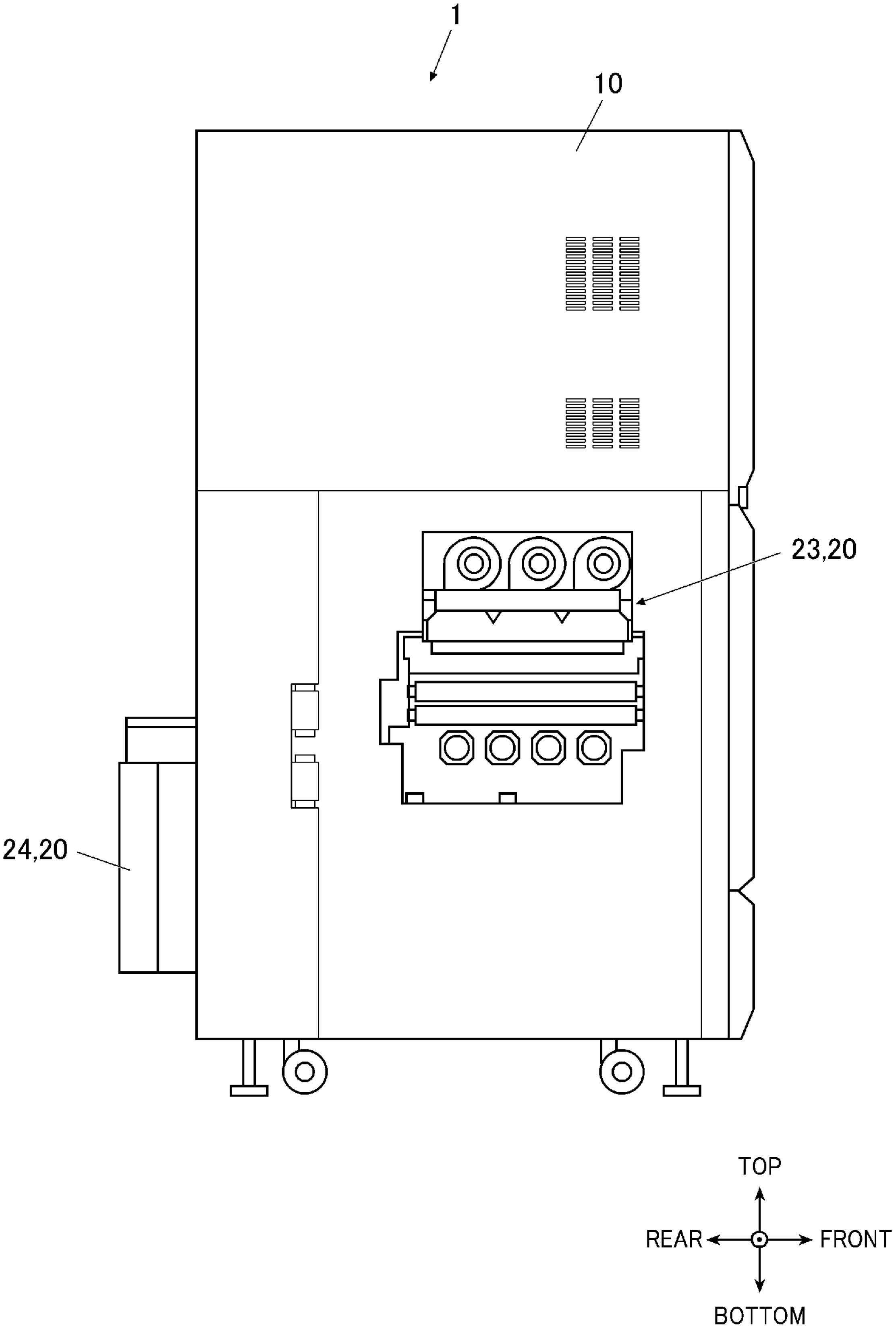
FIG. 3 is a left side view showing the schematic configuration of the image forming apparatus according to this embodiment.

As shown in FIGS. 1 to 3, the removable unit 20 includes a toner bottle supply unit (toner bottle unit) 21, a sheet introduction guide unit 22, a sheet discharge guide unit 23 and a cleaning unit 24. All the units 21 to 24 described above are units (first units) attachable to the outside of the main body 10. The removable unit 20 is a unit that extends the function of the main body 10. That is, the removable unit 20 is a unit that is attached to the main body 10 and improves the function of the main body 10. For example, this unit is connected to the main body 10 as with a sheet feed apparatus and a post-processing apparatus, but is different from an optional apparatus that plays a role different from that of the main body 10.

The toner bottle supply unit 21 is a unit that conveys and supplies toner from an internal toner bottle to the main body 10 (large-capacity hopper unit HU2), and is attached to the right side (adjacent to the large-capacity hopper unit HU2) of the main body 10 (see FIGS. 1, 2 and the like). The toner bottle supply unit 21 includes (five in this embodiment) subunits 21S that are as many as the writers 121 (developers 121*c*) so as to allow toner to be supplied to the respective writers 121 (developers 121*c*). Each subunit 21S is attachable and removable independently of the other subunits 21S.

Conventionally, the toner bottle supply unit 21 is disposed at the position of the large-capacity hopper unit HU2 of the main body 10. To achieve roll sheet printing based on a conventional sheet-fed machine, a unit capable of temporarily storing a large amount of toner is required. Accordingly, the large-capacity hopper unit HU2 is disposed at a position where the toner bottle supply unit 21 is conventionally disposed, and the toner bottle supply unit 21 is attached to the outside of the main body 10. Accordingly, toner can be conveyed and supplied along a flow of the toner bottle supply unit 21→the large-capacity hopper unit HU2→the intermediate hopper unit HU1. The large-capacity hopper unit HU2 is allowed to be added while the components at and after the intermediate hopper unit HU1 are the same as those of the conventional sheet-fed machine.

The sheet introduction guide unit 22 is a conveyance guide unit for introducing a roll sheet into the main body 10, and is attached to the right side of the main body 10 (see FIG. 1 and the like). The sheet introduction guide unit 22 is a unit for allowing roll sheet printing based on a conventional sheet-fed machine, and is a mechanism for guiding, to the main body 10, the roll sheet fed from a sheet feed apparatus, not shown. The sheet introduction guide unit 22 includes guide rollers that can guide the roll sheet.

The sheet discharge guide unit 23 is a conveyance guide unit for discharging the roll sheet from the main body 10, and is attached to the left side of the main body 10 (see FIGS. 1 to 3 and the like). The sheet discharge guide unit 23 is a unit for allowing roll sheet printing based on a conventional sheet-fed machine, and is a mechanism for guiding the roll sheet from the main body 10 toward a winding apparatus, not shown, when discharging the sheet. The sheet discharge guide unit 23 includes guide rollers that can guide the roll sheet.

To allow roll sheet printing based on a conventional sheet-fed machine, mechanisms that guide a continuous roll sheet are required at an inlet and an outlet of the main body 10. The conventional sheet-fed machine does not include guide rollers that can guide a roll sheet at an inlet and an outlet. Accordingly, rollers are required to be added at the inlet and the outlet. There is a problem that components of the sheet-fed machine and attachment peripheral components cannot be commonized. Accordingly, this embodiment adopts the configuration where units (the sheet introduction guide unit 22 and the sheet discharge guide unit 23) including guide rollers at the outside (the inlet and the outlet) of the main body 10 are comprehensively attached, and only attachment holes are commonized with the sheet-fed machine (main body 10). Thus, the roll sheet can be guided while commonly adopting the same components as those of the sheet-fed machine.

The cleaning unit 24 is a unit for preventing materials (e.g., ozone and siloxane) from being discharged to the outside of the main body 10 by a filter, and is attached to the back of the main body 10 (see FIGS. 2 and 3 and the like).

Typically, during electrophotographic printing, substances toxic to the human body sometimes occur. Basically, a filter is added to a source of generating toxic substances to prevent the toxic substances from leaking to the outside. However, regulation cannot sufficiently be effective at the inlet and the outlet in an unavoidable manner in some cases. In such a configuration, measures are taken so that physical coverage is adopted at the exterior, and filters are provided at limited portions serving as air holes. In recent environmental situations, a substance having not been legislatively regulated may be newly, additionally regulated. In such a case, one type of filter is sometimes not enough to conform to the regulation. Accordingly, in this embodiment, the filter unit (cleaning unit 24) is additionally attached to the outside of the exterior, thus allowing substances that cannot be discharged to the outside to be prevented from being discharged.

The removable unit 20 is configured so that the unit can be packed separately from the main body 10 in a state of being removed from the main body 10.

The removable unit 20 is attached to the main body 10 in the market. Accordingly, simplicity of the attachment operation and reduction in operation time are required. Accordingly, measures for improving the market attachment performance are taken for the removable unit 20.

Hereinafter, the toner bottle supply unit 21 is exemplified, and the configuration for improving the market attachment performance is described.

Figure 5:
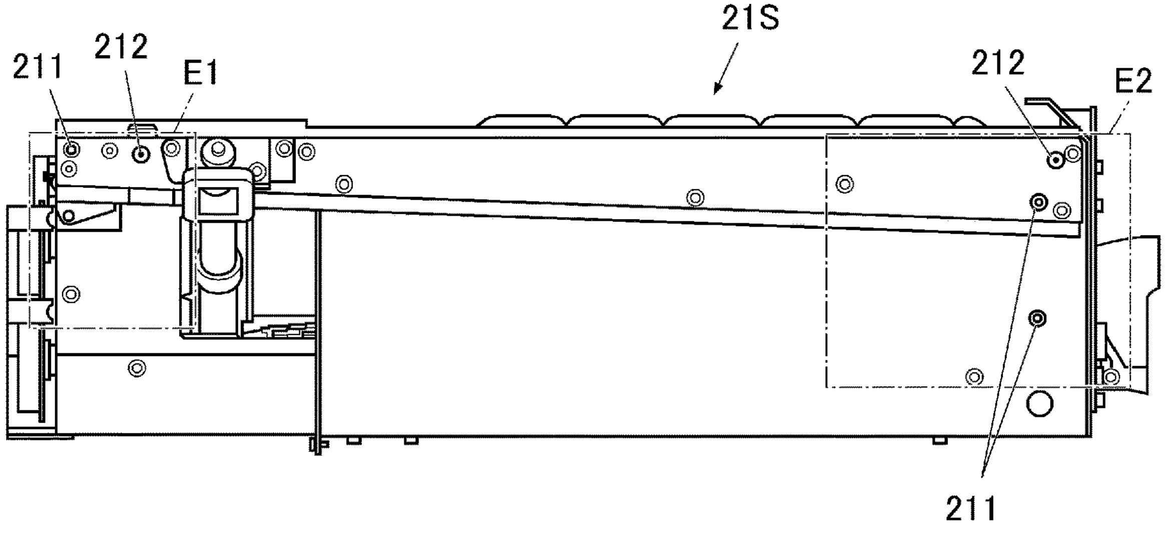
FIG. 5 is a side view of a tonner bottle unit (subunit)
Figure 6A:
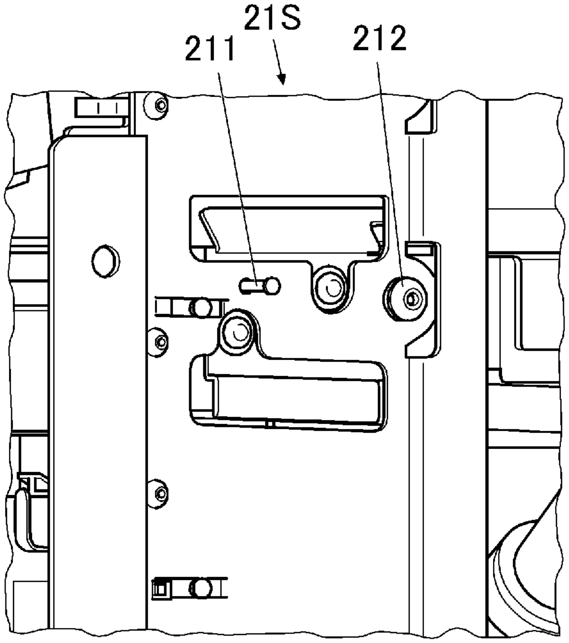
FIGS. 6A and 6B are main part enlarged views of the subunit.
Figure 6B:
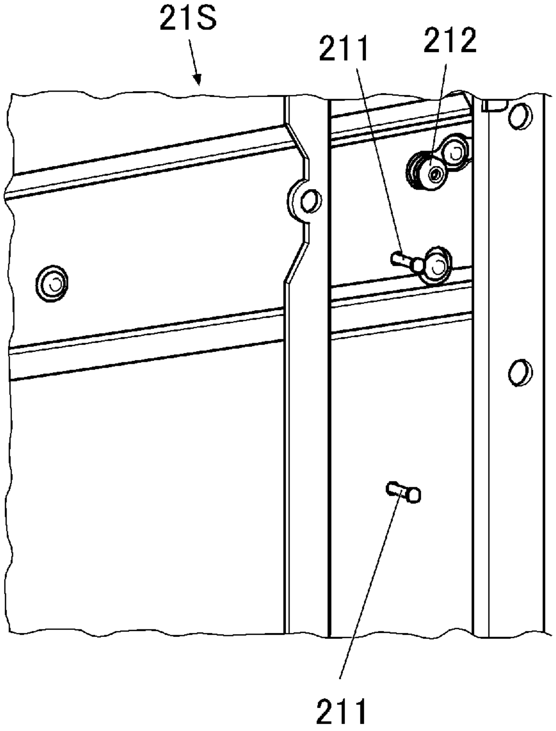
Figure 7:
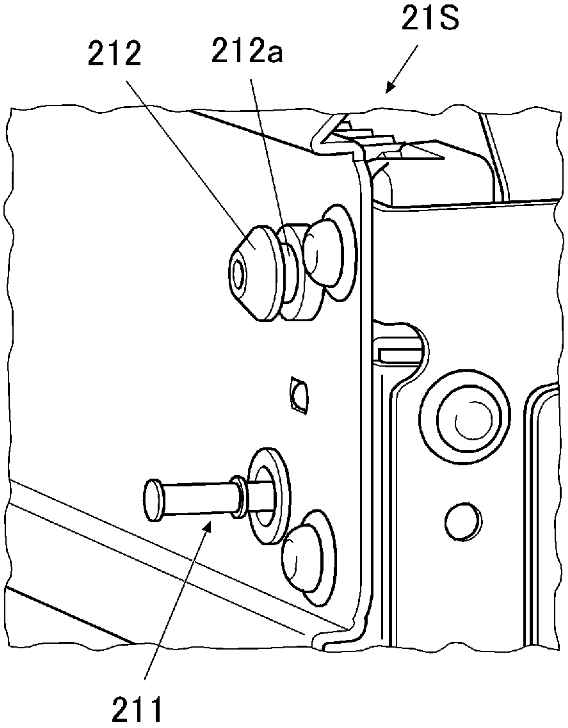
FIG. 7 is a diagram for illustrating an engager provided on a positioning shaft.

To secure the simplicity of the attachment operation and achieve reduction in operation time, three measures ("reduction in the number of screws", "reduction in the number of connections of electrical connectors" and "adjustment-free") are taken (see FIGS. 5 to 7). Note that FIG. 5 is a side view of the toner bottle supply unit 21 (subunit 21S). FIGS. 6A and 6B are enlarged views of main parts of the subunit 21S (FIG. 6A shows an area indicated by a symbol E1 in FIG. 5, and FIG. 6B shows an area indicated by a symbol E2 in FIG. 5). FIG. 7 is a diagram for illustrating an engager 212*a* provided on a positioning shaft 212.

The "reduction in the number of screws" is reduction of the number of screws to the minimum number allowing a required strength for attachment to be secured (only three per color (one subunit 21S)) (see FIG. 5). Thus, the screw fastening operation can be simplified. Note that a symbol 211 in the diagram indicates a screw fastener.

The "reduction in the number of connections of electrical connectors" is that for three types of electric components, connectors for connection between a power source and each electric wire are consolidated into one. Thus, the operation for connecting the connector can be simplified.

The "adjustment-free" is that the positioning shaft 212 is provided for the unit, allowing positioning to be completed only by fitting an attachment plate provided for the main body 10 into that (positioning shaft 212). Thus, the unit can be attached with no error, without complicated adjustment operation.

To secure the safety of the attachment operation and achieve improvement in operation efficiency, two measures are taken.

First, the toner bottle supply unit 21 including subunits 21S for multiple colors (five colors in this embodiment) is not integrally arranged and attached, but is attached on a one-by-one basis instead. This is because integral arrangement of the multiple subunits 21S into one requires a large-sized unit and requires manual operation accordingly, but attachment on a one-by-one basis allows operation by a single person.

Second, the engager 212*a* is provided on the positioning shaft 212 of (each subunit 21S of) the toner bottle supply unit 21 (see FIG. 7). As shown in FIG. 7, a groove is provided in the positioning shaft 212. This groove functions as the engager 212*a*. When each subunit 21S is screw-fastened to the main body 10, the corresponding subunit 21S can be positioned by engaging (fitting) the engager 212*a* to the attachment plate provided for the main body 10. Thus, the engager 212*a* is provided for the positioning shaft 212 of each subunit 21S, thereby allowing operation with the hands free during operation of screw-fastening the corresponding subunit 21S into the main body 10. Accordingly, operation can be performed by a single person.

Next, a packing example of the removable unit 20 configured so as to allow packing integrally with other units is described.

Figure 8:
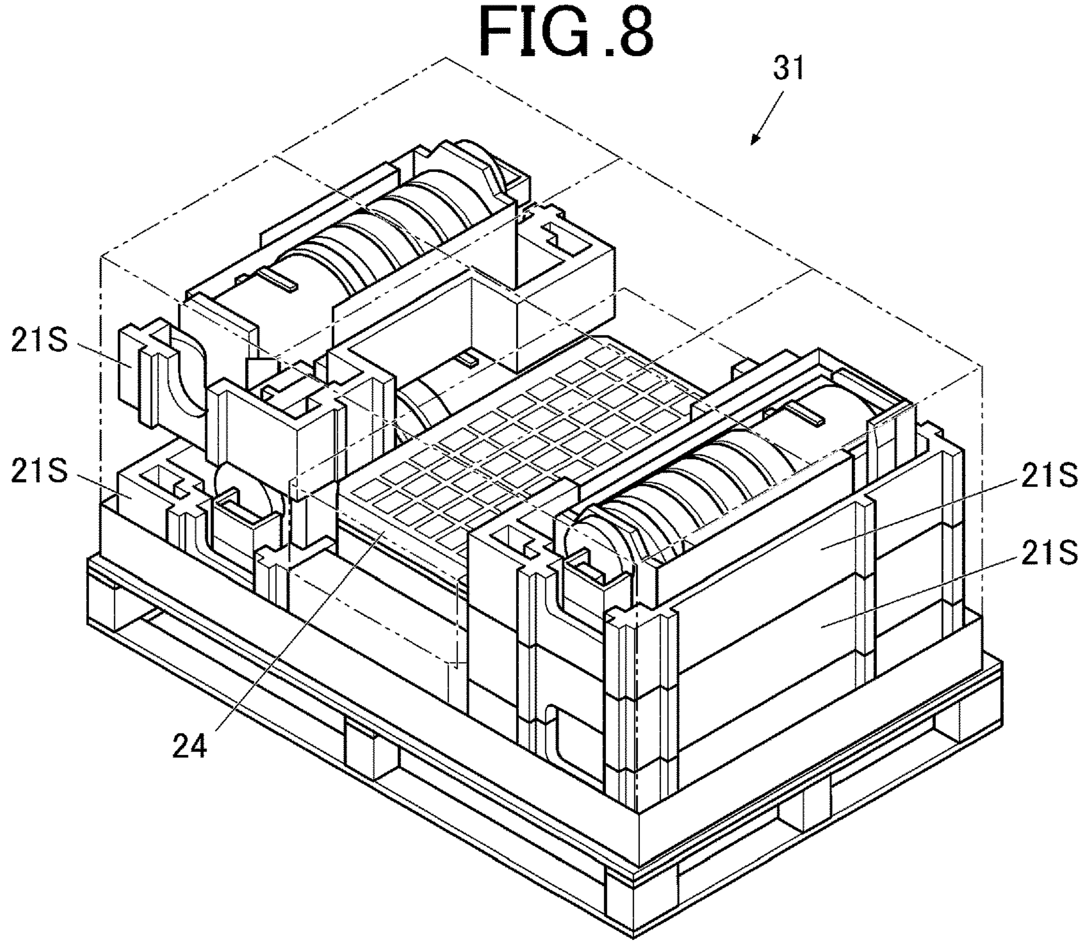
FIG. 8 is an external perspective view of a first packing example.
Figure 9:
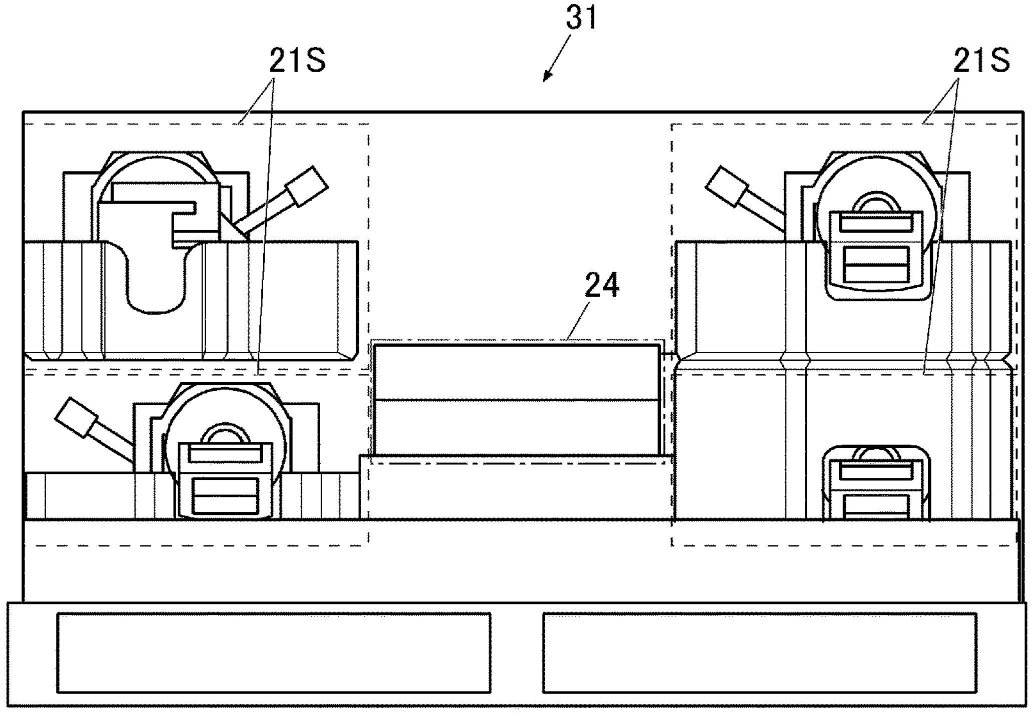
FIG. 9 is a front view of the first packing example.

First, referring to FIGS. 8 and 9, a first packing example 31 is described.

In the first packing example 31, as shown in FIGS. 8 and 9, four-color subunits 21S of the toner bottle supply unit 21, and the cleaning unit 24 are integrally arranged and packed. In this embodiment, the toner bottle supply unit 21 includes the subunits 21S for five colors. However, the subunit 21S for the fifth color is packed separately from the subunits 21S for the four colors. Accordingly, the subunit 21S is excluded from the first packing example 31.

Note that the cleaning unit 24 may be solely packed. However, as with the first packing example 31, packing integrally with the toner bottle supply unit 21 (subunits 21S for the four colors) has less redundancy in view of configuration. Accordingly, the integral packing is adopted.

Here, the integral packing of the subunits 21S for the four colors and the cleaning unit 24 is because the subunits 21S for the four colors and the cleaning unit 24 have shapes of substantially rectangular parallelepipeds, and are easy to be integrally packed. Such integral packing of multiple units can reduce the number of packs. Accordingly, the complication of packing operation can be reduced.

The remaining sheet introduction guide unit 22 and sheet discharge guide unit 23 are packed separately from the first packing example 31. This is because the sheet introduction guide unit 22 and the sheet discharge guide unit 23 are units configured so as to be packable separately from the other units. More specifically, this is because the shapes of the sheet introduction guide unit 22 and the sheet discharge guide unit 23 are three-dimensionally prominent, and the packing materials are required to conform to the shapes. The sheet introduction guide unit 22 and the sheet discharge guide unit 23 are individually packed using packing materials that conform to the respective shapes, which is more advantageous in addressing vibration shocks during transportation than packing integrally with the other units.

Figure 10:
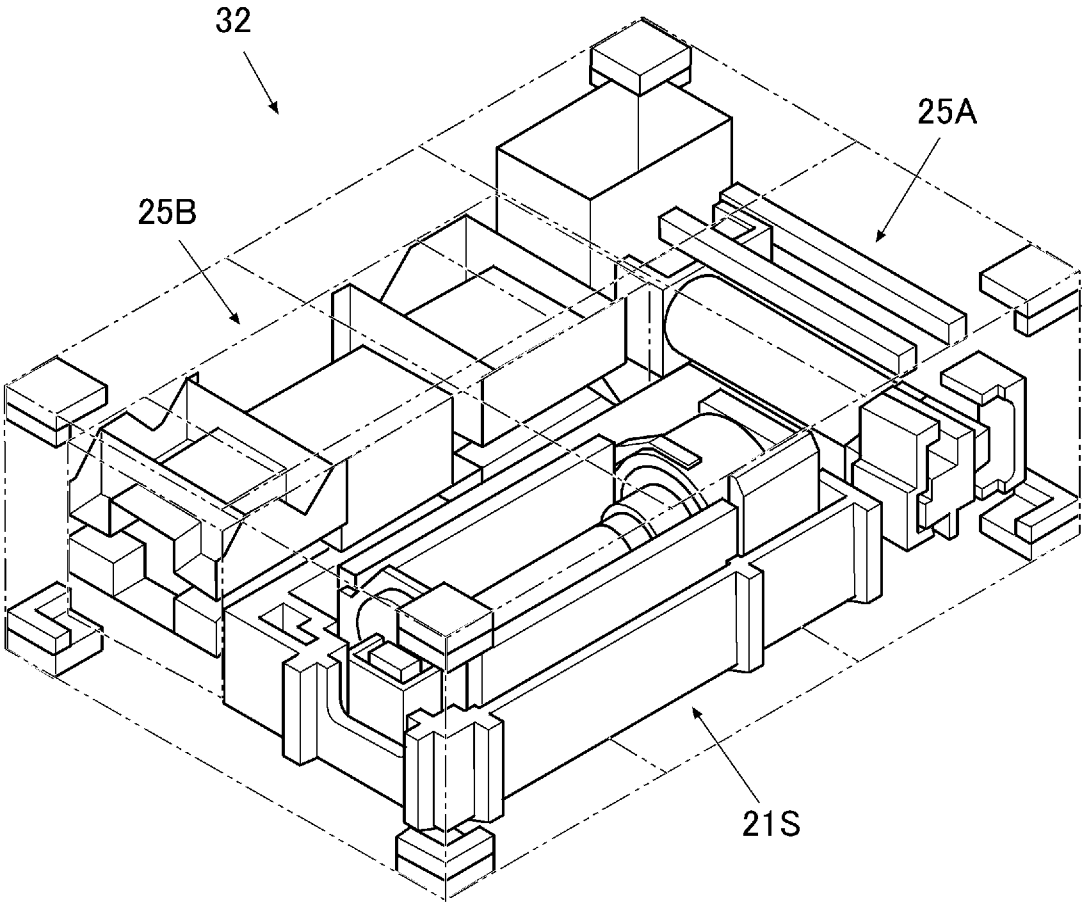
FIG. 10 is an external perspective view of a second packing example.

Next, referring to FIG. 10, a second packing example 32 is described.

In the second packing example 32, as shown in FIG. 10, the fifth-color subunit 21S of the toner bottle supply unit 21, and the fifth-color writing unit (the drum unit 25A, and the development and charging electrode unit 25B) attachable to the inside (image former 12) of the main body 10 are integrally arranged and packed. Note that the development and charging electrode unit 25B is a unit that integrally includes a development unit and a charging electrode unit.

The fifth-color writing unit (the drum unit 25A, and the development and charging electrode unit 25B) is attached to the image former 12 of the main body 10, and functions as the fifth-color writer 121.

That is, according to the second packing example 32, units in the case of adding the fifth color to the image former 12 are integrally arranged and separately packed.

As described above, the unit (the fifth-color subunit 21S of the toner bottle supply unit 21) attachable to the outside of the main body 10, and the unit (the drum unit 25A, and the development and charging electrode unit 25B) (second unit) attachable to the inside (image former 12) of the main body 10 can be integrally arranged and packed. That is, the unit (the drum unit 25A, and the development and charging electrode unit 25B) attachable to the inside of the main body 10 can be included in the removable unit of the present invention.

The removable unit 20 can be attached when the main body 10 is installed. Note that timing of attaching the removable unit 20 to the main body 10 is freely selected. The unit may be attached before the main body 10 is installed or after the main body 10 is installed.

In this embodiment, for example, the toner bottle supply unit 21 is attached before the main body 10 is installed. This is because attachment of the toner bottle supply unit 21 after installment of the main body 10 narrows the operation space for certain handling of a peripheral apparatus, and possibly degrades the operability accordingly.

The sheet introduction guide unit 22 and the sheet discharge guide unit 23 are attached before the main body 10 is installed. This is because attachment of the sheet introduction guide unit 22 and the sheet discharge guide unit 23 after installment of the main body 10 narrows the operation space for certain handling of a peripheral apparatus, and possibly degrades the operability accordingly. Note that it is preferable that the sheet introduction guide unit 22 be attached before the toner bottle supply unit 21. This is because attachment of the toner bottle supply unit 21 before the sheet introduction guide unit 22 causes the toner bottle supply unit 21 to hamper attachment of the sheet introduction guide unit 22.

The cleaning unit 24 is attached after the main body 10 is installed. This is because the cleaning unit 24 is a unit to be attached to the back of the main body 10, and its final attachment integral with connection of the peripheral apparatus allows comprehensive operation, which achieves effectiveness.

As described above, the image forming apparatus 1 according to this embodiment includes the main body 10 that forms an image on a sheet, and the removable unit 20 that is attachable and removable to and from the main body 10. The removable unit 20 includes the unit attachable to the outside of the main body 10, and is packable separately from the main body 10 in a state removed from the main body 10.

Consequently, the image forming apparatus 1 according to this embodiment allows the main body 10 and the removable unit 20 to be transported respectively using appropriate packing materials, and can prevent the apparatus from being deformed by adverse effects of vibration shocks occurring during transportation. Without additional reinforcement, the main body 10 can be packed with a conventional packing material, which can prevent the cost from increasing.

The image forming apparatus 1 according to this embodiment allows the removable unit 20 to be attached when the main body 10 is installed.

Consequently, the image forming apparatus 1 according to this embodiment allows the main body 10 and the removable unit 20 to be separately packed and transported, and can prevent the apparatus from being deformed by adverse effects of vibration shocks occurring during transportation, and prevent the cost from increasing.

According to the image forming apparatus 1 of this embodiment, the removable unit 20 includes the unit packable separately from another unit.

Consequently, the image forming apparatus 1 according to this embodiment allows packing using the packing materials that conform to the respective shapes of the units (e.g., the sheet introduction guide unit 22 and the sheet discharge guide unit 23) that are packable separately from the other units. Accordingly, each unit can be further securely prevented from being deformed owing to vibration shocks during transportation.

According to the image forming apparatus 1 of this embodiment, the removable unit 20 includes the unit packable integrally with another unit.

Consequently, according to the image forming apparatus 1 of this embodiment, the multiple units (e.g., the toner bottle supply unit 21 and the cleaning unit 24 and the like) packable integrally with the other units can be integrally packed, which can reduce the number of packs and reduces the complication of the packing operation.

According to the image forming apparatus 1 of this embodiment, the removable unit 20 includes the unit attachable to the inside of the main body 10.

Consequently, according to the image forming apparatus 1 of this embodiment, a case of adversely affecting the inside of the main body 10 (for example, toner is spilled) when the unit attachable to the inside of the main body 10 is transported in an attached state can be prevented. Accordingly, the apparatus can be stably transported.

According to the image forming apparatus 1 of this embodiment, the removable unit 20 is the unit that extends the function of the main body 10.

Consequently, according to the image forming apparatus 1 of this embodiment, units that could often be transported in a state attached to the main body 10 can be packed separately from the main body 10 and transported. Accordingly, a case of adversely affecting the main body 10 (for example, deformation and breakage of the apparatus, tonner spillage, etc.) when the units attachable to the main body 10 are transported in the attached state can be prevented. Accordingly, the apparatus can be stably transported.

Thus, the specific description is made based on the embodiment according to the present invention. However, the present invention is not limited to the embodiment described above, and can be changed within a range without deviating from the gist.

According to the embodiment described above, for example, the toner bottle supply unit 21 and the sheet introduction guide unit 22 are attached to the right side of the main body 10, the sheet discharge guide unit 23 is attached to the left side of the main body 10, and the cleaning unit 24 is attached to the back of the main body 10. However, the configuration is not limited to this. The units attachable to the outside of the main body 10 may be attached to any surface only if the surface is among the external surfaces of the main body 10.

Note that the units attachable to the outside of the main body 10 are not limited to those in the example described above. For example, an additionally provided toner bottle supply unit can be attached to the front (frontal surface) of the main body 10, a waste toner collection box that can continuously discharge waste toner to the outside and a conveyance hose can be attached to the bottom of the main body 10, and a pilot lamp that can issue a notification about the state of the main body 10 can be attached to the top surface of the main body 10.

Detailed configurations of the devices that constitute the image forming apparatus and detailed operations of the devices can be changed as appropriate within a range not deviating from the spirit of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image forming apparatus, comprising:

a main body that forms an image on a sheet; and a removable unit that is attachable and removable to and from the main body, wherein the removable unit is attachable to an outside of the main body, and is packable separately from the main body in a state removed from the main body, the removable unit includes at least one of a toner bottle unit that supplies toner to a large capacity hopper unit of the main body, a sheet introduction guide unit, or a sheet discharge guide unit, wherein the sheet introduction guide unit is for introducing a roll sheet and the sheet discharge guide unit is for discharging a roll sheet, and wherein the image forming apparatus is capable of forming an image with the removable unit being attached to the main body.

2. The image forming apparatus according to claim 1, wherein the removable unit is attachable when the main body is installed.

3. The image forming apparatus according to claim 1, wherein the removable unit includes a filter unit.

4. The image forming apparatus according to claim 1, wherein the removable unit is packable separately from another unit of the removable unit.

5. The image forming apparatus according to claim 1, wherein the removable unit is packable integrally with another unit of the removable unit.

6. The image forming apparatus according to claim 1, additionally comprising a second removable unit attachable to an inside of the main body.

7. The image forming apparatus according to claim 1, wherein the removable unit is a unit that extends a function of the main body.

* * * * *